Dec. 7, 1937. A. J. FISCHER 2,101,810
FLOCCULATION
Filed Nov. 18, 1935 4 Sheets-Sheet 1
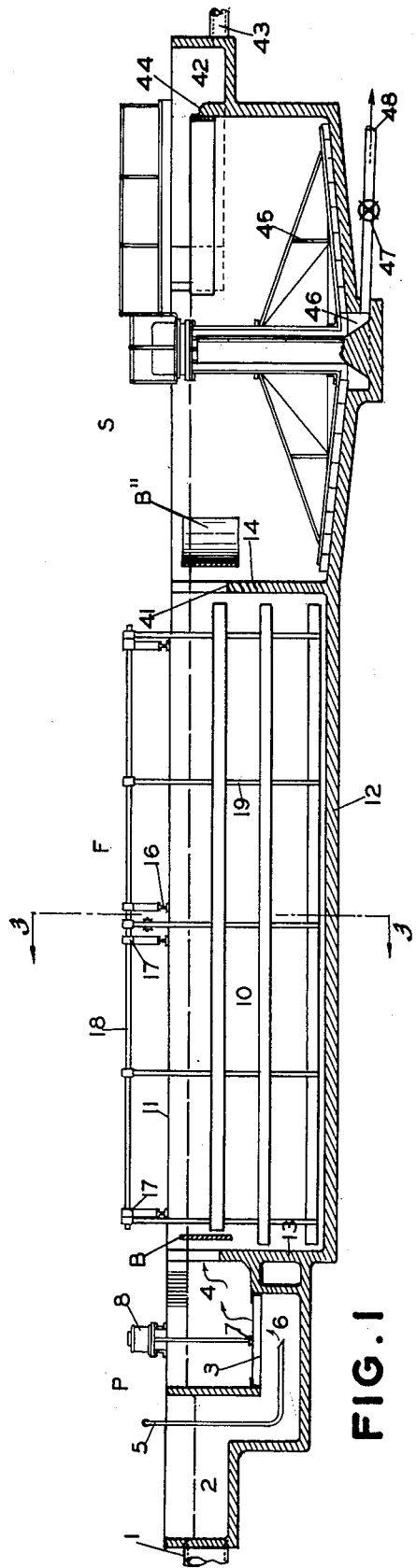
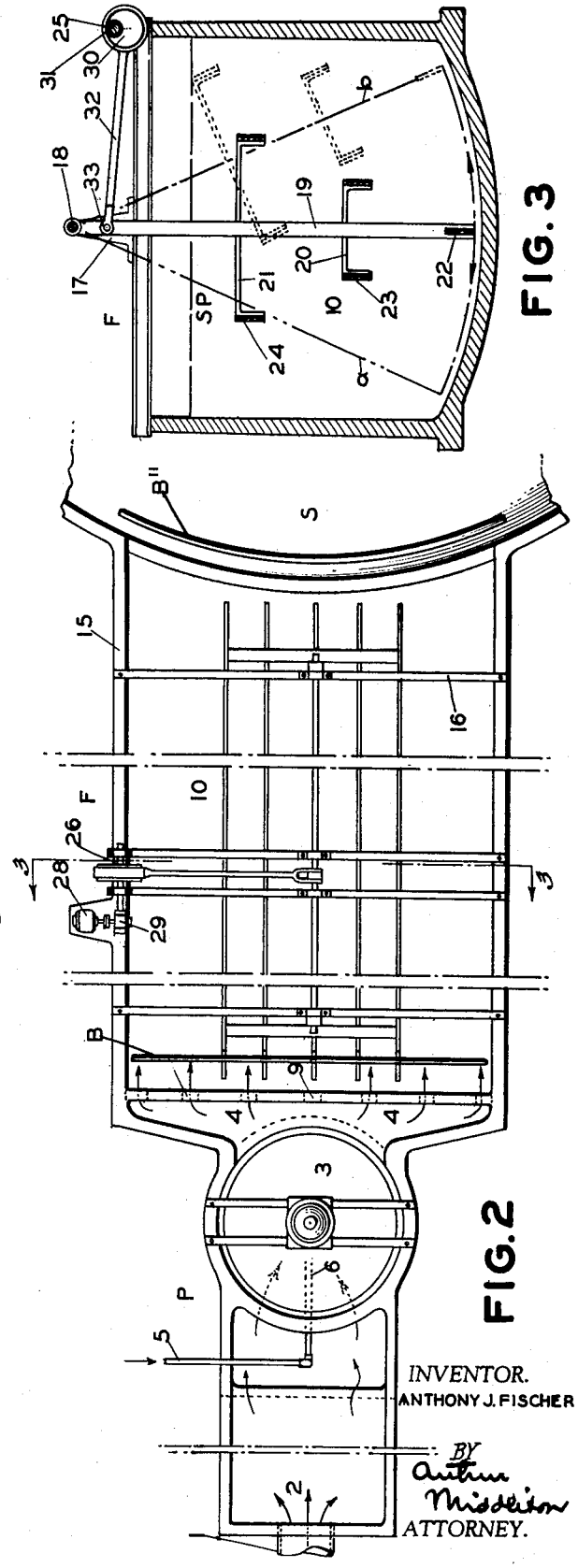
INVENTOR.
ANTHONY J. FISCHER
BY
Anthony Middleton
ATTORNEY.

Dec. 7, 1937.  A. J. FISCHER  2,101,810
FLOCCULATION
Filed Nov. 18, 1935    4 Sheets-Sheet 2

INVENTOR.
ANTHONY J. FISCHER
BY
Anthony Middleton
ATTORNEY.

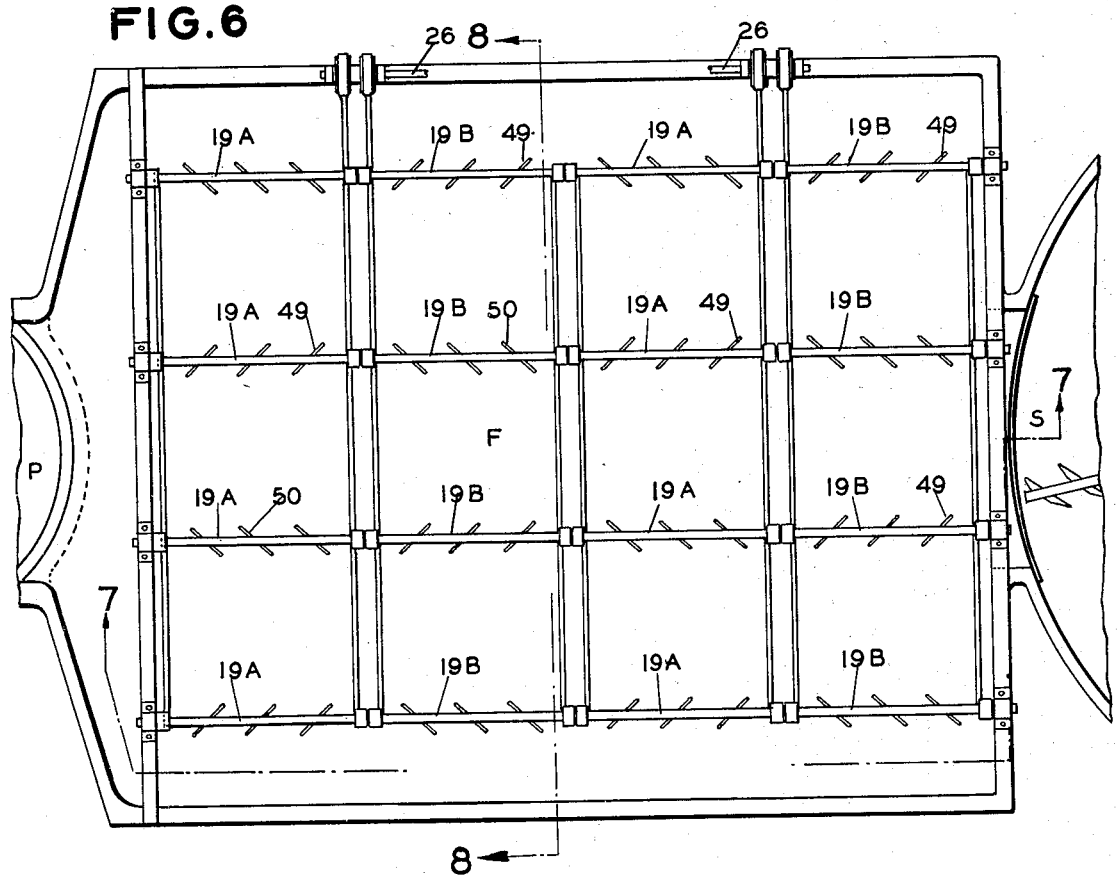
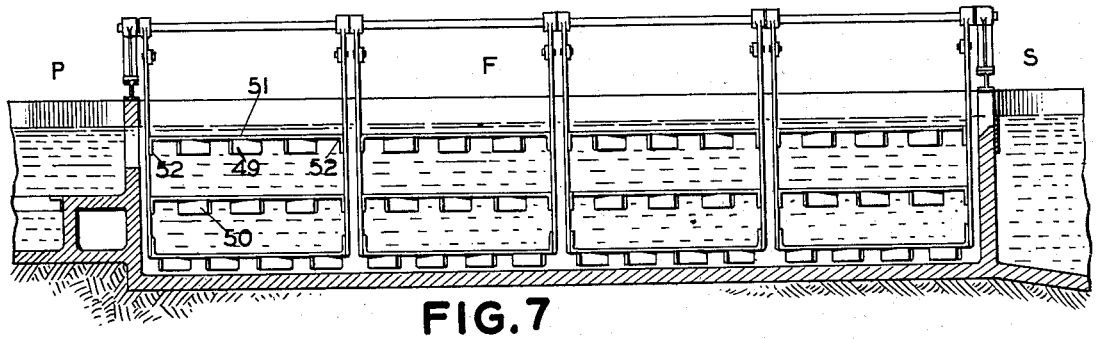
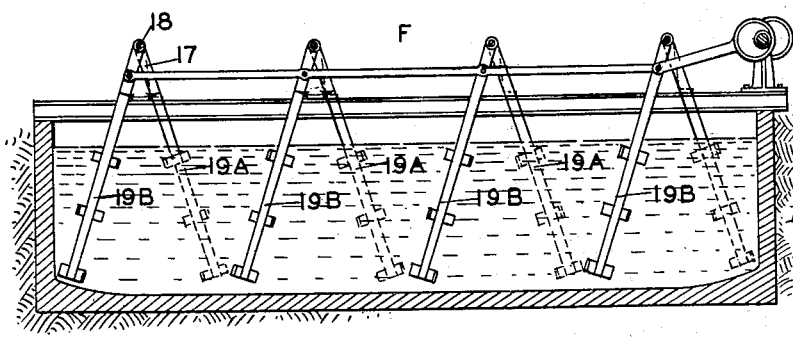

Dec. 7, 1937.  A. J. FISCHER  2,101,810
FLOCCULATION
Filed Nov. 18, 1935  4 Sheets-Sheet 4
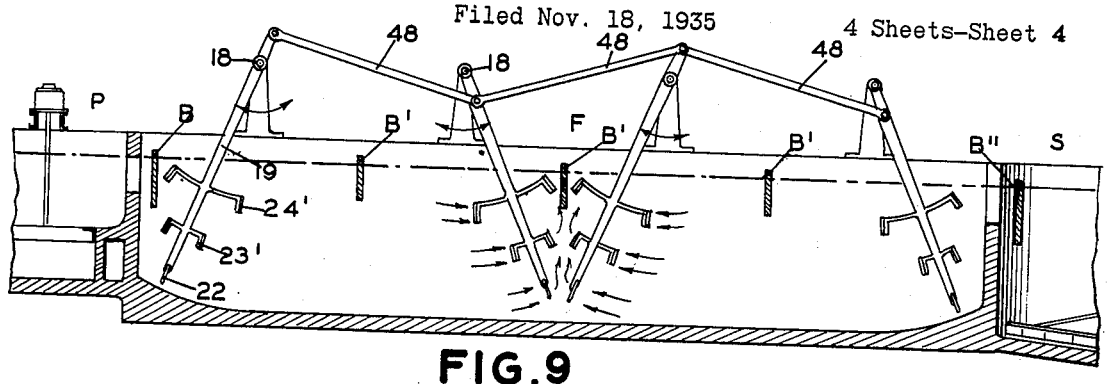
FIG. 9
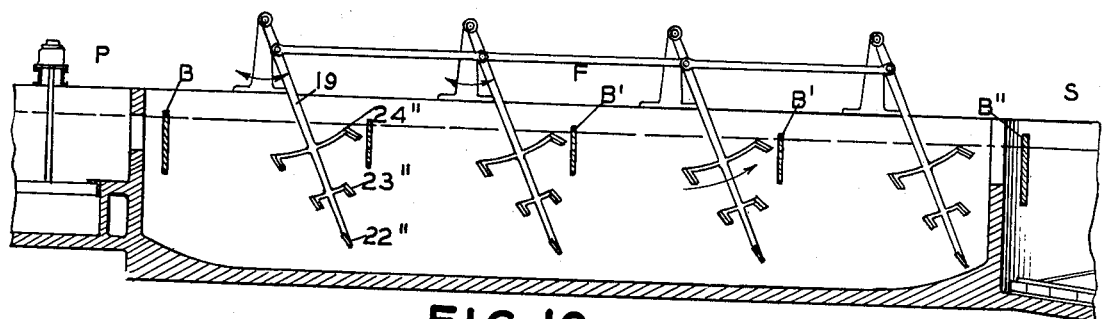
FIG. 10
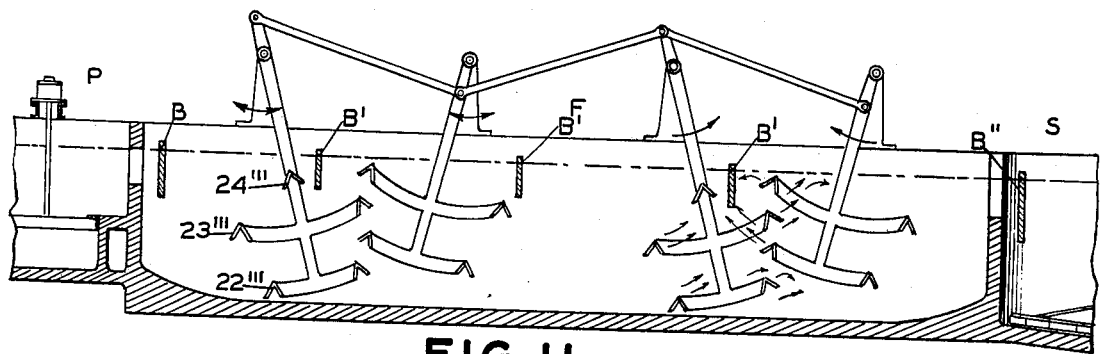
FIG. 11
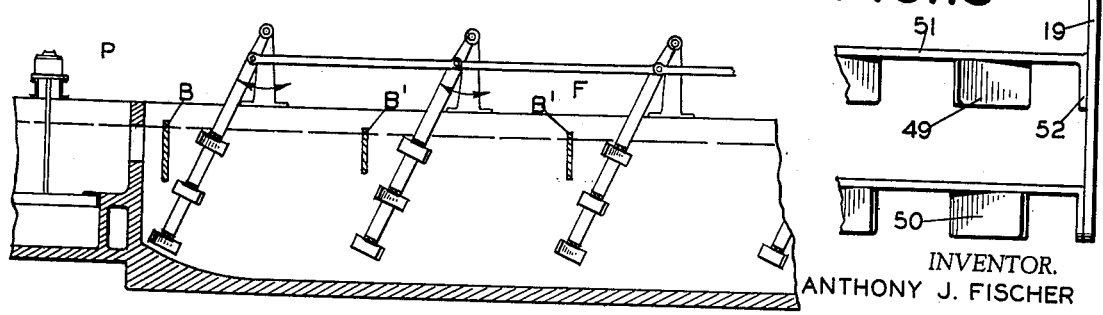
FIG. 12
FIG. 13
INVENTOR.
ANTHONY J. FISCHER
BY Anton Middleton
ATTORNEY.

Patented Dec. 7, 1937

2,101,810

UNITED STATES PATENT OFFICE 2,101,810

FLOCCULATION

Anthony J. Fischer, Jackson Heights, N. Y., assignor to The Dorr Company, Inc., New York, N. Y., a corporation of Delaware Application November 18, 1935, Serial No. 50,337

12 Claims. (Cl. 210—16)

This invention relates to the clarification or purification of polluted or impure liquids such as water, sewage, trade wastes or the like having solids therein, wherein flocculation comprises one step of the purification treatment.

In the carrying out of the invention a pretreatment is applied of a character to initiate, form or release floc or floc nuclei.

The pretreatment may involve any one of several operations dependent upon the particular aim to be attained. According to some situations it may involve an aerating operation either alone or in conjunction with a dosing operation as, for example, when sewage is being treated to effect a change of said constituents therein in order to produce a colloidal condition and to consequently initiate or form floc or floc nuclei. According to other requirements, the pretreatment may involve a chemical dosing as by hydrated lime which is introduced and intimately mixed with the incoming liquid in a manner whereby the floc or floc nuclei are initiated or formed. According to other situations the pretreatment may involve a chemical dosing as by the introduction and intimate mixing of ferric chloride with the incoming liquid for the purpose, according to one point of view, of functioning as a coagulating agent or, from another point of view, of functioning as a releasing agent to initiate, form or release floc or floc nuclei.

A primary aspect of the present invention revolves about the subjecting, within a flocculation section or zone, of liquid which has been pretreated to initiate, form or release floc or floc nuclei to gentle but positive agitative effects of a character to further and aid the flocculation such as by oscillating a pendulum type of agitator construction.

The bladed type of agitator construction shown herein as being one type embodying this invention is such that the pendulum oscillating point or axis is located above the general level of the liquid within the flocculation basin or section. The lower depending portion of the pendulum construction extends into the liquid within the flocculation basin or section and carries—in fact includes—agitating assemblies of paddles or blades of substantial extent. These agitating paddles or blades preferably extend horizontally; they are transversely spaced, preferably at different vertical elevations, and as the pendulum construction oscillates they move in directions transverse to that in which the blades or paddles extend.

These blades or paddles may be referred to as rectilinear members of substantial extent and as being aligned agitating blades or paddles which have movement transverse to the direction in which they extend. They may be also considered as functioning to produce positive agitative effects in zones one over the other and between which there exist—in alternating arrangement—zones substantially devoid of any substantial agitative effects or at least of the direct agitative effects resulting from the transverse reciprocatory movements of the blades.

By the employment of a pendulum type of floc conditioning element and of the blades arranged as referred to, there are effected positive agitative effects within each localized zone wherein non-disruptive collisions between flocs are realized and there is effected a gentle but positive flow movement of the body of liquid in a zone of agitation relative to a non-agitated zone adjacent thereto, all being carried out under conditions favorable to floc formation and floc amassing due to the consequent contacting of floc nuclei or floc particles with each other as well as with other fine particles in suspension.

Floc formations which are furthered by the conditioning treatment just referred to are of necessity relatively delicate and easily broken up but they are very advantageous and useful in obtaining the settling and elimination of minute particles in suspension in the liquid. An end desired, however, by the treatment is a relatively clear effluent, and in order that this desired end may be practically and ultimately realized the liquid which has been agitated in a manner to aid flocculation in the flocculation section is passed or drifts along a relatively unobstructed flow path under conditions which permit a ready and easy flow, whereby there will be avoided any agitative actions of a character to detrimentally affect or break up to any substantial degree the flocs which have been formed. The flocculated material thus passed in a gentle manner from the flocculation zone or section is delivered to and into a sedimentation zone or section of the combined flocculation-sedimentation tank, wherein the liquid is subjected to sedimentation under conditions that allow the floc and other solid matter suspended in the liquid to settle into the form of sediment or sludge. The result of this sedimentation operation just referred to is the production of a supernatant liquid which passes from the sedimentation zone or basin along one path and the accumulation of the floc in the sediment or sludge settling at the bottom of the sedimentation basin. From time to time or continuously, as required, the sludge or settled solids thus derived as a result of the sedimentation is swept by travelling sludge rakes from diverse sections of the floor or bottom of the sedimentation basin to discharge therefrom under conditions of cleanliness which precludes any sludge remaining in the basin long enough to go septic.

It is to be noted that in the flocculation zone the liquid is maintained in a continued state of turbidity, or, as otherwise expressed, the flocs are maintained in suspension due to the agitative effects resulting from the operation of the bladed floc conditioner construction. The flocs are purposely not allowed to settle in this flocculation section and are kept in motion so that they are always available for contacting with the incoming floc or floc nuclei as well as with other previously formed floc or suspensoids whereby the flocculation operation can be progressively carried on.

The apparatus shown is of a continuous type in that there is a continuous supply of pretreated material to and into the flocculation section or basin and a continuous and progressive delivery passage of flocculated material from the flocculation section or basin to and into the sedimentation section or basin.

The invention possesses other objects, aspects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

In the drawings—

Figure 1 is a vertical longitudinal sectional view of a continuous liquid-treating apparatus having a pretreating section into which influent is initially received, a flocculation section or zone into which liquid from the pretreating section passes and wherein agitative effects of a gentle but positive character are imparted by moving bladed assemblies to the body of liquid therein to aid or further flocculation, and a sedimentation section or zone for receiving the flocculated liquid, in which zone relatively quiescent conditions prevail whereby a sedimentation operation is carried on so that supernatant liquid passes off or is withdrawn as relatively clear effluent;

Figure 2 is a plan view of the apparatus shown in Figure 1 but on a somewhat larger scale, certain portions of the flocculation section or zone and a portion of the sedimentation section or zone having been broken away as will be manifest, this figure being on a larger scale than Figure 1;

Figure 3 is a vertical cross-section or vertical transverse view of a flocculation section or basin and is a view taken as on the plane indicated by the line 3—3 of Figure 1 or 2 looking in the direction of the arrows, Figure 3 having the same scale as Figure 2;

Figure 4:
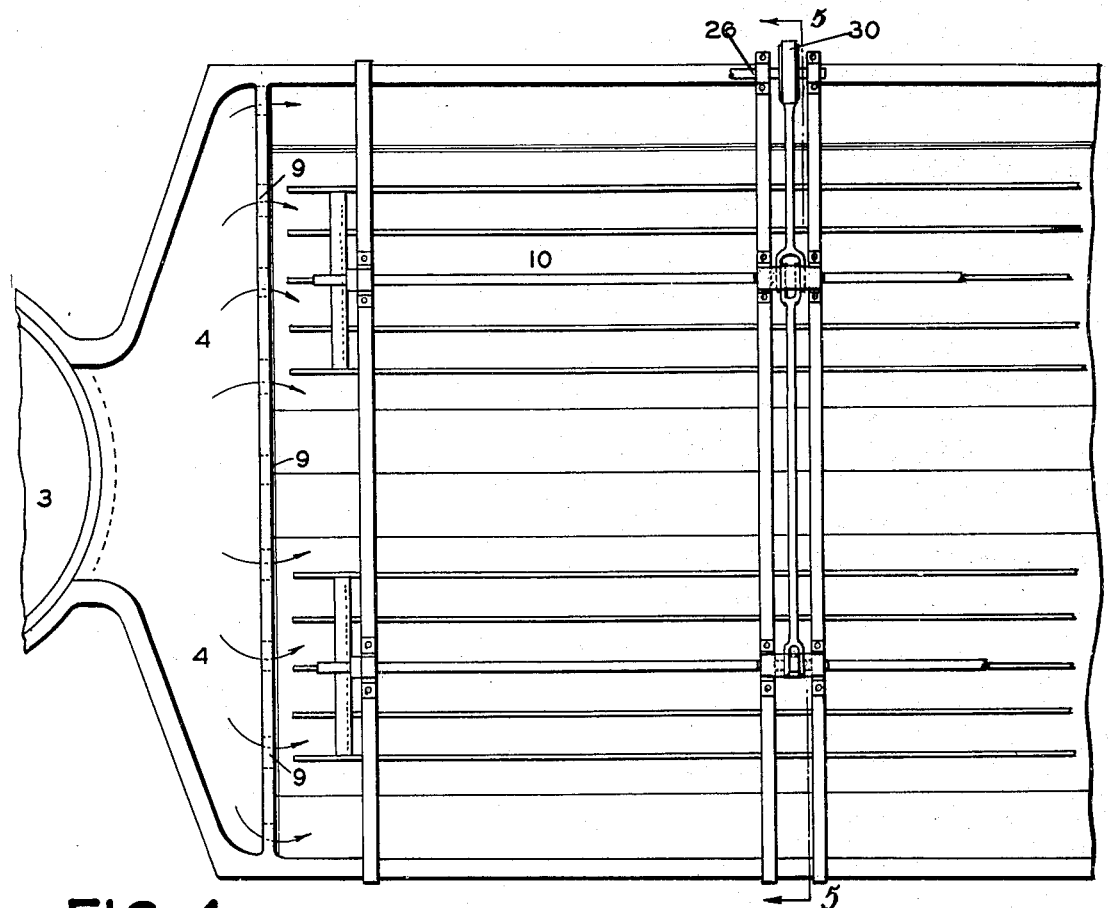
Figures 4 and 5 show a modified flocculation apparatus which can be employed as an alternate to the flocculation apparatus shown in Figures 1 to 3, Figure 4 being a partial plan view and Figure 5 a vertical transverse sectional view taken as on the plane indicated by the line 5—5 of Figure 4 looking in the direction of the arrows.

Figures 6, 7 and 8 are respectively a plan view, a vertical longitudinal sectional view, and a transverse sectional view of another form or modified flocculation apparatus, Figure 7 being a view taken as on the planes indicated by the broken line 7—7 of Figure 6 looking in the direction of the arrows, and Figure 8 being a view taken as on the plane indicated by the line 8—8 of Figure 6 looking in the direction of the arrows;

Figures 9, 10, 11 and 12 are vertical sectional views illustrating forms of flocculation apparatus different from each other and also different from any other forms heretofore referred to;

Figure 13 is a view illustrating a detail of certain agitating paddles or blades that may be employed, the blades of this figure being shown in the Flocculator arrangement of Figures 6 to 8 inclusive and in the arrangement of Figure 12.

Reference will now be made to the drawings in detail.

The showing of the arrangement as illustrated in and by Figures 1 to 3 inclusive is to be considered as typically illustrating the environment, general location and functional operation of any selected type of flocculation apparatus illustrated. Apparatus wherein agitative effects of a gentle but positive character are employed for aiding or furthering flocculation is sometimes sold under the trade name "Flocculator".

Flocculation apparatus constructed and functioning according to the present invention embodies a Flocculator or flocculation section or zone designated F that is operatively positioned between a pretreating section P and a sedimentation section or zone S. The zones F and S, however, are subdivisions of a main basin.

Each Flocculator illustrated has certain fundamental characteristics in common. Each is employed in essentially the same or equivalent operative arrangement. There exist certain specific differences peculiar to each form illustrated. It will be readily realized that the essential principle of the new types of flocculation apparatus may be embodied in many forms other than those specifically illustrated.

In some of the figures there are indicated vertically and transversely extending baffle plates that are relied upon for aiding diffusion, for avoiding short-circuiting flows or for preventing undue extension of agitative effects. Baffles such as those referred to are designated as B, B' and B''. Baffles B are relied upon to aid in insuring the proper diffusion of incoming liquid. Baffles B' are for avoiding short-circuiting flow effects and for localizing agitative effects. Baffles B'' are for aiding distribution and preventing agitative effects from the flocculation zone F of the main basin, from upsetting the quiescent conditions in the sedimentation section S of the same basin.

The influent or incoming liquid to be treated, enters the treating system through the feed pipe or channel 1 and is initially delivered into the pretreating section P.

This pretreating section P may be considered as comprising a dosing compartment or sub-section 2, a mixing compartment or sub-section 3, and a diffusing or distributing compartment or sub-section 4.

A dosing or distributing pipe 5 terminates at 6 within the lower portion of the sub-section 2.

Through this pipe 5 air may be delivered—should the pretreatment involve only aeration—in order to initiate a coagulative effect incident to an oxidizing operation.

The pipe 5 may be employed as means by which sludge from a subsequent portion of the system, as from the sedimentation section S, may be introduced into the incoming liquid—for example into raw incoming sewage—for the purpose of accomplishing a "seeding" or dosing operation that is useful preparatory to and in conjunction with a flocculation operation.

It may be that a particular chemical is desired as the dosing agent, such for example as milk of lime Ca(OH)$_2$, if an alkaline type of dosing reagent is to be employed. The pipe 5 may be employed as the means by which said lime hydrate is injected as the dosing agent into the incoming liquid.

This pipe 5 may also be used as a means for the introduction of other types of dosing agents as for example an iron salt or an aluminum salt, to wit, such as iron chloride FeCl$_3$ or aluminum sulphate Al$_2$(SO$_4$)$_3$. Such a salt hydrolyzes to impart an acid effect if otherwise free to do so.

The particular type of pretreating or dosing is not of prime importance in so far as the present invention is involved. It is important, however, that the pretreatment results in the initiation of floc nuclei or in the formation of floc within the liquid preparatory to the introduction of the pretreated liquid into the flocculation section or zone F.

The mixing section or sub-section 3 is preferably provided with a rotatable mechanical agitator 7, as for example the bladed rotor of a turbo mixer, actuated in any suitable manner as from an electric motor 8. This mechanical mixing effects relatively quick, intimate and thorough mixing of the dosing agent in and through the liquid passing throughout this section with the result that by the time the liquid reaches the distributor or distributing sub-section 4 there exists therein and throughout the same a relatively uniform dispersal of initially formed floc or floc nuclei. The pretreated liquid passes through the distributor openings 9 into the head or front section of the flocculation section or zone 11, through which zone it follows a general flowpath and exists at the other end section into the sedimentation zone S.

The stationary structure that provides or defines the flocculation section or zone 11 of the main basin 10 may be considered as comprising a bottom 12, transversely extending end walls or partial partitions 13 and 14, and longitudinally extending side walls 15—15. Within the flocculation zone F defined by this structure, operate paddle or bladed assemblies, the blades of which are aligned and which move in paths that are at right angles to or are transverse to the longitudinal axis of the zone F. The bladed assemblies are arranged generally parallel to the flowpath of liquid flowing through said zone and they extend along the zone sufficiently so that the liquid of that zone is gently and transversely agitated substantially throughout its length.

By this structure and more particularly by the side walls thereof there is carried stationary transversely extending beams 16 upon which stationary bearings 17 are in turn carried. These bearings receive and support a shaft or shafting 18. This shafting provides the oscillation point or horizontal line in respect to which the lower portion of a depending swinging bladed pendulum construction SP oscillates or moves repeatedly back and forth.

The pendulum construction SP just referred to includes the pendulum rods 19, blade supporting members 20 and 21 carried by and extending from the pendulum rods 19, and agitating blades or paddles 22, 23 and 24. These agitating blades or paddles are rectilinear members and are mounted so that as the pendulum construction swings back and forth they have bodily movement transverse their general extent. The paddle 22 is lowermost and is carried by and at the lowermost end of the pendulum rods. Paddles or blades are arranged in transversely spaced relationship at different heights or elevations and are respectively carried by and at ends of the supporting members 20 and 21.

A drive shaft 25 is carried on stationary bearings 26. This shaft 25 is driven from the motor 28 through the medium of suitable speed reducing and power transmission mechanism or gearing at 29. The shaft 25 carries and has connected thereto an eccentric 30. An eccentric strap 31 having operative engagement with the eccentric 30 is provided on one end of the connecting rod 32, the other end of which connecting rod has a pivotal connection at 33 to an upper portion of the pendulum rod 19. As the drive shaft 25 turns there is effected, because of the eccentric and eccentric rod actuated thereby, an oscillatory or swinging movement of the pendulum construction about or on the shaft 18 as a center whereby the pendulum rod 19 oscillates or moves repeatedly back and forth between the dash and dot lines $a$ and $b$ of Figure 3. It will be noted that this oscillatory movement is of a character to cause the agitating paddles 22, 23, and 24 to substantially traverse certain zones within the flocculation section. These agitating paddles 22, 23 and 24—described above as being rectilinear, as having transverse reciprocatory or oscillating movements, and as being transversely spaced in different vertical elevations in respect to each other—function in localized zones one above the other and in alternate arrangement with respect to zones in which the liquid therein is viewed as not being positively agitated.

In the Flocculator F of these Figures 1 to 3 the gentle but positive agitative effects are carried out, of a character conducive to the aiding or furthering of flocculation operations. The agitative effects of the assemblies of paddles or blades are sufficient to maintain the solids in suspension without allowing any substantial sedimentation thereof with the result that in the flocculation zone the liquid is maintained in a state of substantial turbidity and with the further result that incoming liquid which is continuously supplied to and flowed through that zone, is gently but positively agitated so that there is realized a progressive but insured contacting of the incoming floc or floc nuclei with previously formed floc or even with solid particles in suspension whereby the desired floc formation or floc agglomeration is progressed or increased.

The flocculated liquid passes out from an end section of the "Flocculator" or flocculation section F relatively free and unobstructedly, directly into the sedimentation zone or section S of the main basin 10. In the construction of Figures 1 to 3, there is shown a partial partition provided at 14 whereby a submerged discharge section at 41 insures a direct, easy and unobstructed flow from the flocculation section F into the sedimentation section S thus avoiding any substantial tendency to break up or disintegrate the flocs which have been completed or augmented in the flocculation zone.

The purpose of the partial partition at 14 is primarily to serve as a separator effective between the flocculation section F and the sedimentation section S whereby the agitative action necessary and favorable to the furthering of flocculation is carried out in a section which is relatively separate and distinct from the section in which the sedimentation is carried out and wherein quiescent conditions favorable to sedimentation are maintained. In other words this partial partition serves for retaining in the flocculation zone settleable flocs for recirculation into and through the liquid being flocculated. Except for the purpose of separating the section which is subjected to agitative effects from the section wherein quiescent conditions are to prevail free from the direct agitative effects, it would be feasible to entirely eliminate this partial partition 14 and to rely upon a gradual merging of the flocculation section into the sedimentation section incident to the gradual dying out or lessening of the agitative effects carried out in the flocculation section.

The sedimentation section S has a supernatant withdrawal means 42 by which there is a passing from the upper portion of the sedimentation section or zone S of relatively clarified liquid which passes from the system, as along one path 43, as clarified effluent. The supernatant withdrawal or outflow means 42 just referred to has an overflow weir section 44 that determines the normal level of the body of liquid both in the sedimentation zone and in the flocculation zone. In other words, there is a relatively constant and progressive gravity flow of the liquid from the time it enters the pretreating portion of the system up to the time it overflows the weir of the sedimentation tank.

A travelling raking mechanism is provided at 45 for raking and impelling settled solids or the sediment of settled flocculated material and other solids which have gravitated therewith, from diverse sections of the floor of the sedimentation tank to a discharge sump 46. A valve-controlled pipe 47 provides the means by which, from time to time as desired, the settled solids which have been passed into this sump may be removed or withdrawn as along a path 48 different from that along which the clarified effluent passes.

Figure 5:
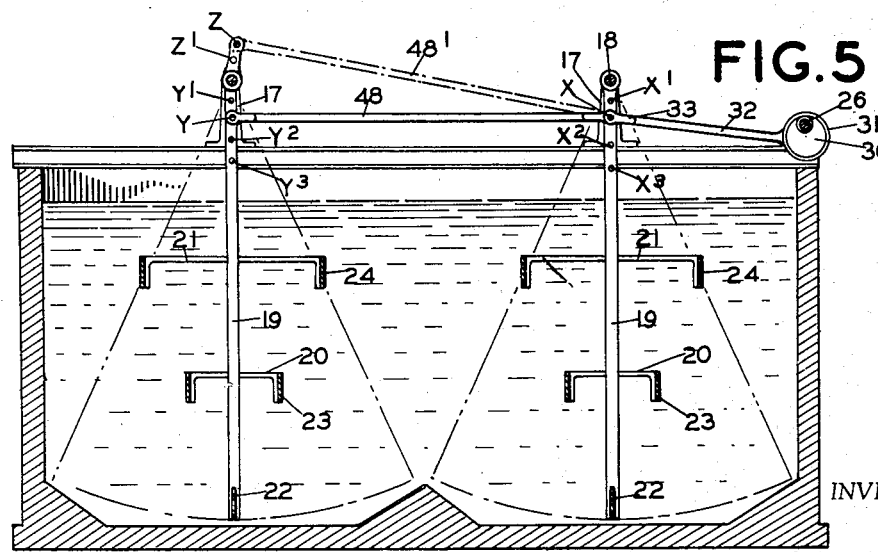

The flocculation arrangement of Figures 4 and 5 is essentially the same, as to its environment, as that of the arrangement of Figures 1 to 3 inclusive. The Flocculators of Figures 4 and 5, however, instead of having a single pendulum construction as shown in Figures 1 to 3, have a dual set of pendulum agitators, each of which is essentially the same as the pendulum agitator construction of Figures 1 to 3, and like reference characters have therefore been applied, particularly the reference characters 17 to 24 inclusive. The pendulum agitator constructions of Figures 4 and 5 are arranged parallel to each other, that is side by side. When connected according to the solid line connecting rod construction shown, they swing in unison, simultaneously in the same direction. This swinging movement is accomplished through the operation of drive shaft 26 having eccentric 30 thereon, the eccentric rod 32 having at one end thereof the strap 31 in engagement with the eccentric 30 and the end 33 which is pivotally connected at X to one of the pendulum rods 19. The pendulum rods are connected so as to swing simultaneously back and forth in unison and in the same direction through the medium of a link 48 pivotally connected at X and Y to an upper portion of the two pendulum rods 19 shown. It is feasible, however, to operate these pendulum constructions so that they swing towards each other at one time and away from each other at another time, and this end is attained by positioning the rod 48 so that it will occupy the long and short dotted line position shown at 48'. Other degrees of oscillating movement can be realized by connecting the ends of the rod 48 to other pivotal points such as X1, X2, or X3, and Y1, Y2, Y3, Z, or Z1, instead of to X and Y or Z as above referred to. This allows practically any combination of movement which may be desired for the particular pendulum construction shown.

The flocculation section of these Figures 6 to 8 inclusive, in so far as the environment thereof is concerned, has the same relationship between the pretreating section P and the sedimentation section S as that of the flocculation section of Figures 1 and 2.

The distribution of the pretreated liquid into the "Flocculator" of these Figures 6 to 8 is substantially the same as that of the arrangement of Figures 1 and 2. The pendulum construction of the Flocculator of these figures is provided with a number of pendulum rods 19 supported from longitudinally extending shafts 18 carried by bearings 17 on the transversely extending supporting beams or rods 16. The pendulum rods are arranged in sets. The flocculation section may be viewed as having four merging longitudinal sub-sections each of which extends the full width of the tank and each of which is served by four sets of pendulum constructions. In each of said longitudinal sub-sections the pendulum constructions therein simultaneously swing in unison in the same direction. Where a pendulum construction in one section at one time swings to the right, the pendulum construction adjacent thereto swings in the opposite direction or to the left. This is accomplished by having a common operating drive shaft 26 constantly turning in one direction and carrying eccentrics 30 set at 180° to each other as shown in Figure 8. Of these eccentrics some operate the four sets of pendulum constructions designated as 19A, while the others operate the sets of pendulum constructions which are designated as 19B.

One-half of each set of pendulum constructions have agitating paddles or blades as 49 which may be viewed as sloping forwardly and to the left, while the other part of these paddle constructions have agitating paddles or blades 50 which may be viewed as sloping forwardly and to the right. The mode of support for these blades between the pendulum rods 19 is clearly indicated in Figure 7 and is shown on larger scale in Figure 13. The supports for the blades 49 and 50 comprise horizontal carrying rods 51 connected at each end 52 to the pendulum rods 19 of the sets 19A or 19B as the case may be. The paddle blades 49 and 50 depend from the under side of the carrying rods 51. Each carrying rod 51 with the blades 49 and 50 depending therefrom constitutes what may be viewed as a rectilinear blade or paddle element which functions incident to reciprocating back and forth transverse swinging movements imparted thereto.

While the paddle constructions oscillate, some of the paddle blades thereof effect a forward and lateral movement of the particular localized sub-section or sub-zone of the liquid actuated thereby, while others impart a lateral and rearward movement to the localized sub-section or sub-zone of the liquid engaged thereby. The return movement of the pendulum construction causes a reverse type of functioning for each of the paddle blades, with the result that a relatively gentle but positive agitative effect is imparted to different zones in the liquid incident to the swinging of the pendulum construction.

It will thus be seen that the flocculation movements attained by this construction are similar in certain respects but different in other respects from the agitative effects realized by the constructions heretofore referred to. They also have certain operative effects similar and other operative effects different from any of the other constructions hereinafter referred to.

In respect to all the arrangements heretofore described, the pendulum constructions have an oscillating movement transverse to that of the general direction and flow of the liquid through the flocculation zone. In the construction shown in the figures hereinafter referred to, the pendulum constructions oscillate longitudinally, or in other words parallel to that of the general direction which the liquid has while flowing through the flocculation zone.

In the arrangement of Figure 9 the pendulum constructions are practically the same as those of Figures 1 to 3 but they are arranged so that the shafts 18 extend transversely of the flocculation tank with the result that the pendulum constructions carried thereby swing or oscillate longitudinally of the tank or flocculation section. Also in the arrangement of this figure, each pendulum construction swings either towards or from the adjacent pendulum construction as the case may be, or in other words all of the pendulum constructions do not swing in unison in the same direction. According to the showing of this figure the agitating face of each of the rectilinear paddles or blades 23' and 24' is in radial alignment with the axis at 18 corresponding thereto.

In Fig. 10 the pendulum constructions are shown mounted so that they swing in unison and in the same direction forward and backward longitudinally in respect to the flocculation tank or basin. In the construction of this figure the agitating blades or paddles 22", 23" and 24" extend practically the full width of the tank and are slightly inclined downwardly and forwardly relative to the pendulum rod thus creating a downward and rearward agitative effect during the rearward portion of the pendulum movement, and an upward and forward agitative effect during the forward portion of the pendulum movement.

Figure 11 illustrates an arrangement in which four pendulum constructions are employed. These four pendulum constructions are connected so that alternate constructions swing towards each other at one time and away from each other at another time. The transversely extending agitative paddles 22''', 23''' and 24''' thereof are provided by members of inverted V-shape in cross-section and so that when adjacent members are in their closest approach to each other certain of the paddles from the one pendulum construction will enter the space between adjacent paddles of the adjacent pendulum construction. In this way a direct agitative effect from one set of paddles into the zone or space between another or adjacent set of paddles is enabled to be realized. The shape of these agitating paddles is such that they impart lifting components upon the liquid sections engaged regardless as to whether they are moving forwardly or rearwardly. They also impart a forward component during the forward portion of the swing, and a rearward component during the rearward portion of the swing.

According to Fig. 12 the arrangement of the pendulum construction described in connection with Figures 6 to 8 is employed. In this Figure 12, however, the pendulum constructions swing longitudinally of the flocculation basin rather than transversely thereof as shown in Figure 7, but the agitative effects due to the inclination of the agitator paddles are in many respects similar to that of the functioning of the apparatus of Figures 6 to 8. However, according to the arrangement of this Figure 12, all of the pendulum constructions oscillate in unison, and it is to be noted that the paddles are alternately arranged as to inclination whereby a relatively maximum agitative effect throughout the several sections of the flocculators is enabled to be realized.

The detail of Figure 13 is useful in appreciating the construction of the agitator paddles of Figures 6 to 8 and also of Figure 12.

Thus I have devised a main basin arranged to contain a pool of flowing-through liquid having flocculatable impurities therein. The liquid flows longitudinally through one subdivision of the main basin, where it is subjected to treatment by the particular kind of flocculating bladed assemblies claimed, from whence the flocladened liquid passes to another subdivision of the main basin, where it is subjected to clarification by settling, with a resultant outflow from the sedimenting subdivision of clarified effluent along one path and sediment or sludge along another.

I claim:—

1. Apparatus for liquid purification comprising a basin having a flocculation section for holding liquid while undergoing gentle agitative effects conducive to floc formation and amassment, means for supplying thereto liquid having therein material responsive to agitative effects conducive to floc coagmentation and amassment, motivating means, and mechanical agitating means actuated by said motivating means and providing a set of transversely spaced longitudinally extending paddles which are bodily movable and transversely reciprocative in transversely extending closed paths, which are located within said flocculation section and which operate to produce transversely disposed longitudinally extending localized zones of agitative effect in each of which localized zones the paddle corresponding thereto moves in one direction at one time and in a reverse direction at a subsequent period of time, the flocculation section having an outflow passageway permitting a gentle flow and drift of liquid with suspended flocs therein from the flocculation section in amounts corresponding to the quantity of liquid flowing inwardly through the supply means and under conditions such as there is avoided the breaking up of flocs which are within the effluent leaving the flocculation section, in which apparatus the total width of the flow passages of the means for supplying liquid to the flocculation section is narrow as compared with the total width of the flocculation section, and wherein there is provided a baffle for aiding the diffusion of the incoming liquid across the internal initial portion of the flocculation section.

2. Apparatus for liquid purification comprising a flocculation basin having a bottom and longitudinal side walls extending upwardly from said bottom and provided for holding the liquid while undergoing gentle agitative effects conducive to floc formation, means for feeding liquid thereto at one end thereof, an outflow path leading from the other end thereof and through which liquid with flocs in suspension can drift in a manner to avoid substantial disruptive effects on the drifting flocs, mechanical agitating means having vertically and transversely spaced horizontally and longitudinally extending agitator paddles arranged to function within said basin and having transverse movement back and forth so that each paddle operates to produce agitative effects in a localized zone, in each of which localized zones the paddle corresponding thereto moves at one time in one direction and at another time in a reverse direction and means for imparting back and forth movement to the paddles.

3. Apparatus for liquid purification comprising a liquid receiving and holding basin having a bottom and longitudinal side walls extending upwardly from the bottom, a feed trough leading to and delivering into one end of the basin; an effluent passageway leading from the other end of the basin and providing an easy flow path into and through which liquid with flocs suspended therein can drift from the basin in a manner to avoid substantial disrupting of the flocs; and bladed means for imparting gentle agitative effects to each of several zones arranged one above the other and alternately in respect to zones which are not thus directly agitated, said means comprising a series of longitudinally extending bladed agitating elements of substantial extent and transversely spaced relative to each other, each of which agitating elements has transverse back and forth movement completely within but throughout the particular zone agitated thereby; and means for imparting the transverse back and forth movement to the bladed agitating elements.

4. Apparatus for liquid purification comprising a liquid holding basin of substantially horizontal extent wherein a flocculation operation is carried out, an influent feed leading thereto, an effluent passageway leading therefrom, into and through which the liquid with flocs suspended therein can flow and drift from the basin in a manner to avoid substantial disruptive effects on the flocs, a pendulum type of agitating construction arranged with the center of oscillation of the pendulum construction above the level of the liquid within the basin and providing lower submerged portions carrying vertically spaced rectilinear agitating members of substantial extent, and mechanism for imparting reciprocatory movement to the pendulum construction.

5. A construction as defined in and by claim 4 according to which the axis of the pendulum construction parallels the general direction of flow movement for the liquid passing through the flocculation basin.

6. A construction as defined in and by claim 4 according to which the axis about which the pendulum construction swings is transverse to that of the general movement of the liquid flowing through the basin.

7. A construction as defined in and by claim 4 according to which the pendulum construction comprises two sets of paddle structures arranged in tandem and according to which means is provided for operating the pendulum construction so that as one paddle structure swings in one direction the successive paddle structure swings in a reverse direction.

8. A construction as defined in and by claim 4 according to which a plurality of pendulum constructions are arranged side by side and according to which there is means whereby the pendulum constructions during one period simultaneously swing in one direction and during a succeeding period simultaneously swing in a reverse direction.

9. A construction as defined in and by claim 4 according to which a plurality of pendulum constructions are arranged side by side and according to which there is means by which when one of the constructions is swinging in one direction the construction adjacent thereto is swinging in an opposite direction.

10. Apparatus for liquid purification comprising a flocculation basin having a bottom and longitudinal walls extending upwardly from said bottom thereby providing a trough shaped section wherein a body of liquid is maintained; an influent feed leading to and delivering into one end of the trough shaped section of the flocculation basin; means operable for producing gentle but positive agitative effects of a character to produce floc coagmentation and amassment in respect to flocculatable material within the body of liquid within the trough shaped section; a sedimentation basin providing a sedimentation section in constant hydraulic communication with the delivery end of the trough shaped section of the flocculation basin; a transversely and vertically extending partial partition and an associated baffle for functionally separating the trough shaped section and the sedimentation section; and an effluent means leading from the upper portion of the sedimentation basin and determining the normal minimum operative level within both of said basins; said vertically and transversely extending partial partition having an extent for the full width of the flocculation basin but for only part way of the height of the liquid holding section at the deliverey portion of the Flocculator basin whereby the hydraulic communicating passageway thus left between the basins is sufficiently large to permit an easy flow and drift and in a manner in avoidance of disruptive effects on the drifting flocs as the liquid containing the same passes from the flocculation basin into the sedimentation basin, and said vertically and transversely extending baffle plate being located at the delivery side of said partition and provided for aiding in distributing the flocculated liquid into and across the receiving section of the sedimentation basin and for preventing agitative effects within the flocculation basin from extending into and upsetting quiescent conditions in the sedimentation basin.

11. Apparatus for flocculating and clarifying liquids, which comprises a basin divided into a longitudinally-extending flocculation zone and a sedimentation zone, a feed of liquid to be flocculated for the head section of the flocculation zone whereby the liquid follows a general flow-path through the flocculation zone entering at one end section and exiting from the other end section directly into the sedimentation zone, an outflow outlet for clarified liquid from the sedimentation zone, a sediment-discharge means for the sedimentation zone, travelling means for impelling to discharge sediment in the sedimentation zone; and flocculation means comprising groups of a plurality of assemblies of aligned bladed elements within the flocculation zone and extending substantially parallel to the longitudinal axis of that zone, with motivating means for moving said bladed elements in paths that extend at right angles to said longitudinal axis whereby the liquid of the flocculation zone substantially throughout its length is gently agitated transversely to the direction of its flowpath.

12. Apparatus according to claim 11, in which adjacent assemblies of bladed elements operate in directions opposie to each other.

ANTHONY J. FISCHER.